United States Patent
Funk et al.

(10) Patent No.: US 6,669,301 B1
(45) Date of Patent: Dec. 30, 2003

(54) FURNITURE ARTICLE HAVING PANEL AND INTEGRAL PERIMETER FRAME

(75) Inventors: Nancy A. Funk, Grand Rapids, MI (US); Robert J. Battey, Grand Rapids, MI (US); James J. Betcher, Shelbyville, MI (US); Kurt R. Heidmann, Grand Rapids, MI (US); Michael J. Kemen, Lowell, MI (US)

(73) Assignee: Steelcase Development Corporation, Caledonia, MI (US)

( * ) Notice: Subject to any disclaimer, the term of this patent is extended or adjusted under 35 U.S.C. 154(b) by 0 days.

(21) Appl. No.: 09/724,088

(22) Filed: Nov. 28, 2000

(51) Int. Cl.$^7$ .................................................. A47C 7/02
(52) U.S. Cl. ............................ 297/452.63; 297/DIG. 2; 297/452.31; 297/452.15
(58) Field of Search ........................ 297/452.63, 452.64, 297/452.65, 452.13, 452.15, 452.2, 452.56, 300.4, DIG. 2, 452.31, 452.18, 452.54, 452.14; 264/252; 156/108, 245, 308.2

(56) References Cited

U.S. PATENT DOCUMENTS

| | | | | |
|---|---|---|---|---|
| 3,363,943 A | * | 1/1968 | Getz et al. | 297/DIG. 2 X |
| 4,368,917 A | * | 1/1983 | Urai | 297/DIG. 2 X |
| 4,418,958 A | * | 12/1983 | Watkin | 297/DIG. 2 X |
| 4,495,740 A | | 1/1985 | Sarrazin et al. | |
| 4,502,731 A | * | 3/1985 | Snider | 297/DIG. 2 X |
| 4,865,794 A | | 9/1989 | Nakajima et al. | |
| 4,892,356 A | * | 1/1990 | Pittman et al. | 297/DIG. 2 X |
| 4,962,964 A | * | 10/1990 | Snodgrass | 297/DIG. 2 X |
| 5,116,556 A | | 5/1992 | Danton | |
| 5,123,702 A | * | 6/1992 | Caruso | 297/DIG. 2 X |
| 5,225,141 A | | 7/1993 | Hendry | |
| 5,318,433 A | | 6/1994 | Loren | |
| 5,324,189 A | | 6/1994 | Hendry | |
| 5,447,762 A | | 9/1995 | Loren | |
| 5,951,110 A | * | 9/1999 | Conner et al. | |
| 6,035,901 A | | 3/2000 | Stumpf et al. | |
| 6,059,368 A | | 5/2000 | Stumpf et al. | |
| 6,382,719 B1 | * | 5/2002 | Heidmann et al. | |
| 6,412,869 B1 | * | 7/2002 | Pearce | |

OTHER PUBLICATIONS

Exhibit A, Discloses a webpage www.theknollshop.com/sbd/knollshop/home.nsf, showing a "Toledo" chair manufactured by Knoll Int'l. and made public prior to filing date of the present application.

* cited by examiner

Primary Examiner—Peter M. Cuomo
Assistant Examiner—Stephen Vu
(74) Attorney, Agent, or Firm—Price Heneveld Cooper Dewitt & Litton

(57) ABSTRACT

A furniture component, such as a chair back or seat, includes a panel component made of a flexible compliant plastic, and a rigid tubular perimeter frame integrally molded onto and hence bonded to a perimeter flange of the panel component to structurally support the panel component. The panel component includes horizontally extending flexible strips shaped to provide comfortable support for a seated user. The perimeter frame extends continuously around the enlarged show area and is made by gas assist processes, which cause the perimeter frame to be tubular and hollow for increased strength-to-weight ratio. Methods related to the above are also disclosed.

22 Claims, 3 Drawing Sheets

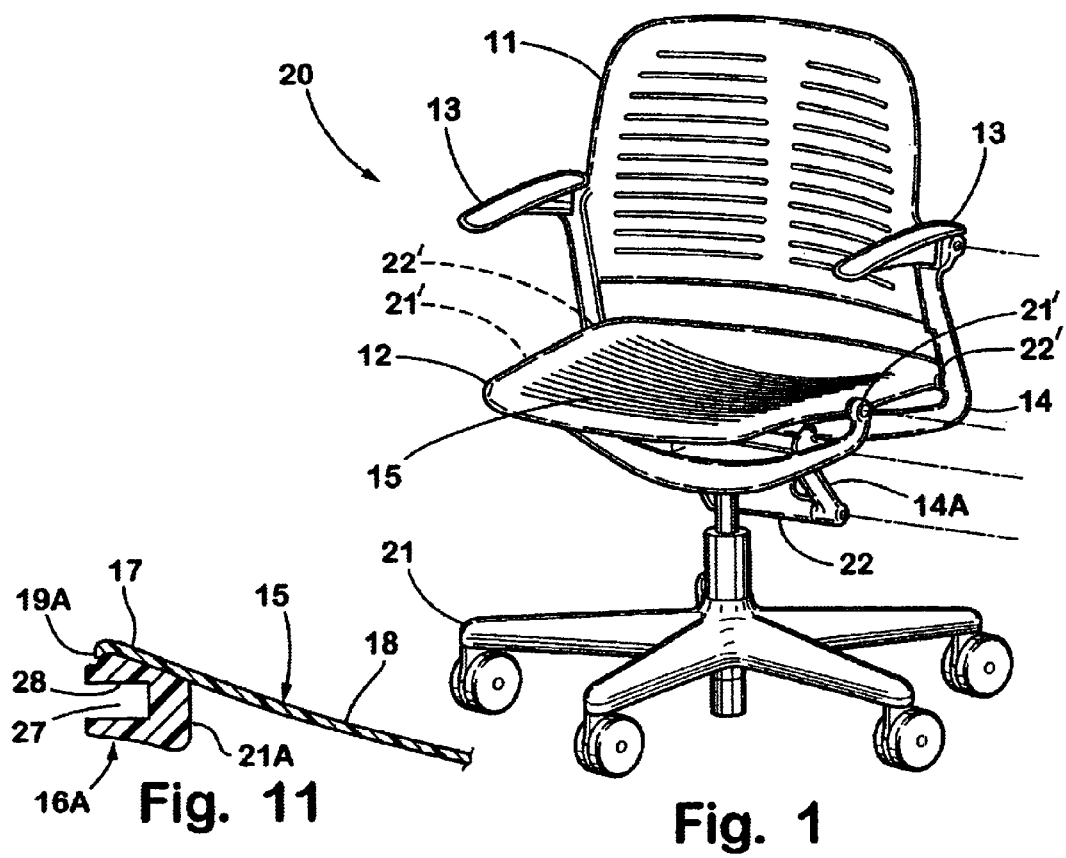
Fig. 1
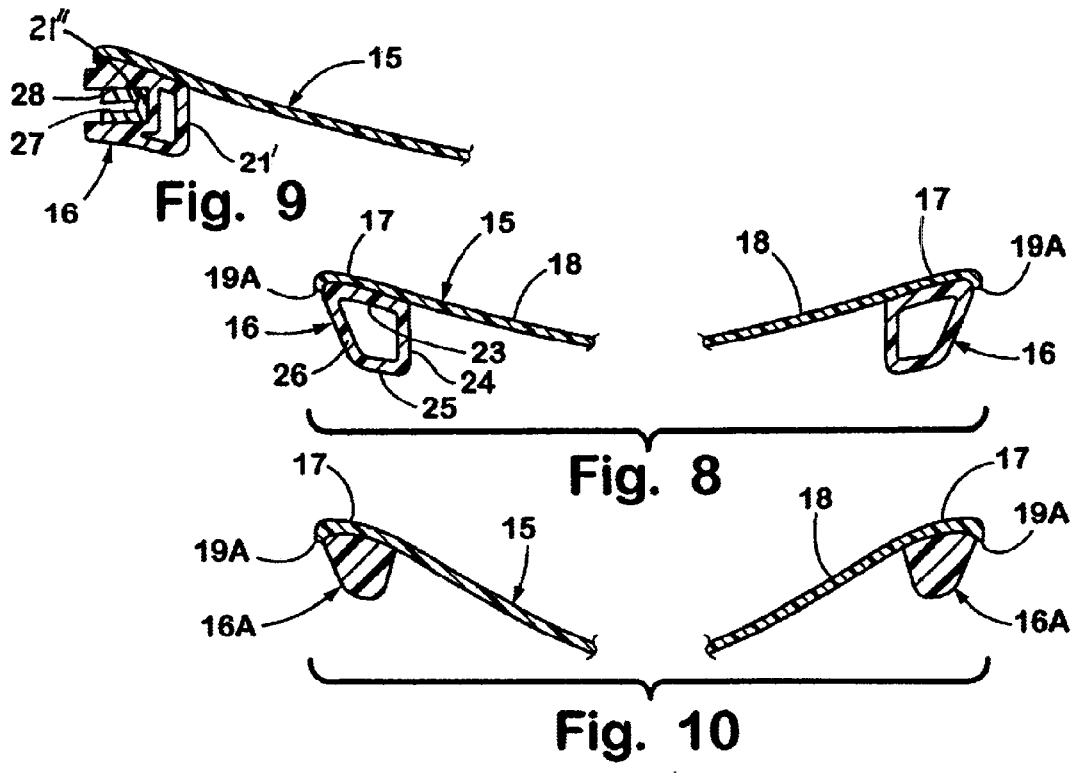
Fig. 11
Fig. 9
Fig. 8
Fig. 10

FURNITURE ARTICLE HAVING PANEL AND INTEGRAL PERIMETER FRAME

BACKGROUND

The present invention relates to an apparatus having a panel and an integral perimeter frame, and more particularly relates to a furniture article having a flexible panel and a molded-on perimeter frame.

The assignee of the present invention recently developed an all-plastic synchrotilt chair that is characteristically light in weight, yet durable and in some versions, stackable. In one version of the chair, a seat was made that included a flexible center section with laterally extending strips for resiliently supporting a seated user. The seat further included an integrally formed tubular perimeter frame made of contiguous material to the center section, which was made by gas assisted molding processes. However, further improvements are desired.

Specifically, development has shown that it is difficult to have a single material that satisfactorily forms a flexible center section, yet that also is stiff enough to form a rigid tubular perimeter frame to stabilize the center section. For example, the flexible center section needs to be made of a material that is compliant, long lasting in flexure without failure, mar-resistant, and capable of providing a good defect-free appearance. Further, the material of the center section must be capable of flowing along small cross sections for relatively long distances in order to form long flexible strips. On the other hand, the perimeter frame material needs to provide high strength and stiffness, and preferably needs to be optimally suited for gas assisted molding processes. These requirements are conflicting, since materials that flow well through small cross sections for long distances, tend to have lower strength and lower stiffness properties than are desired for structural components.

These and other features, advantages, and objects of the present invention will be further understood and appreciated by those skilled in the art by reference to the following specification, claims, and appended drawings.

SUMMARY OF INVENTION

In one aspect of the present invention, a furniture component includes a panel component made of a flexible compliant plastic, the panel component having a continuous perimeter flange and further having flexible strips extending between portions of the perimeter flange that are shaped to flex to comfortably support a human body part. The furniture component further includes a perimeter frame made of a reinforced structural plastic different than the flexible compliant plastic, the perimeter frame being integrally molded onto and bonded to the perimeter flange to stiffen the perimeter flange and support the panel component.

In another aspect of the present invention, an article includes a panel component of a first material having a central area with an enlarged show surface and having a perimeter flange extending continuously around the central area. A tubular frame of a polymeric second material is integrally molded onto and bonded to the perimeter flange to stiffen and support the panel component. The second material is stiffer than the first material and adapted to provide rigid lightweight structural support for the panel component.

In yet another aspect of the present invention, a method of manufacturing a furniture component includes steps of molding a panel component of a flexible compliant plastic, the panel component having a continuous perimeter flange and further having flexible strips extending between portions of the perimeter flange that are shaped to flex to comfortably support a human body part. The method further includes molding a perimeter frame of a reinforced structural plastic different than the flexible compliant plastic onto the panel component, including as part of this molding step integrally bonded the perimeter frame to the perimeter flange to stiffen the perimeter flange and support the panel component.

In another aspect of the present invention, a method of manufacturing an article comprising steps of forming a panel component of a first material having a central area with an enlarged visible surface and having a perimeter flange extending continuously around the central area. The method further includes molding a tubular frame of a polymeric second material integrally onto the perimeter flange to stiffen and support the panel component, the second material being characteristically stiff and bonded to the perimeter flange to provide rigid lightweight structural support around a perimeter of the panel component.

These and other features, advantages, and objects of the present invention will be further understood and appreciated by those skilled in the art by reference to the following specification, claims, and appended drawings.

DESCRIPTION OF THE DRAWINGS

FIG. 1 is a perspective view of a chair including a seat and a back embodying the present invention;

FIGS. 8–9 are cross sections taken along the lines VIII—VIII and IX—IX in FIG. 5;

FIG. 10 is a cross section similar to FIG. 8 of an alternative construction of the perimeter frame;

FIG. 11 is a cross section similar to FIG. 9 of the alternative construction.

DETAILED DESCRIPTION OF THE PREFERRED EMBODIMENT

Figures 2, 3, 4:
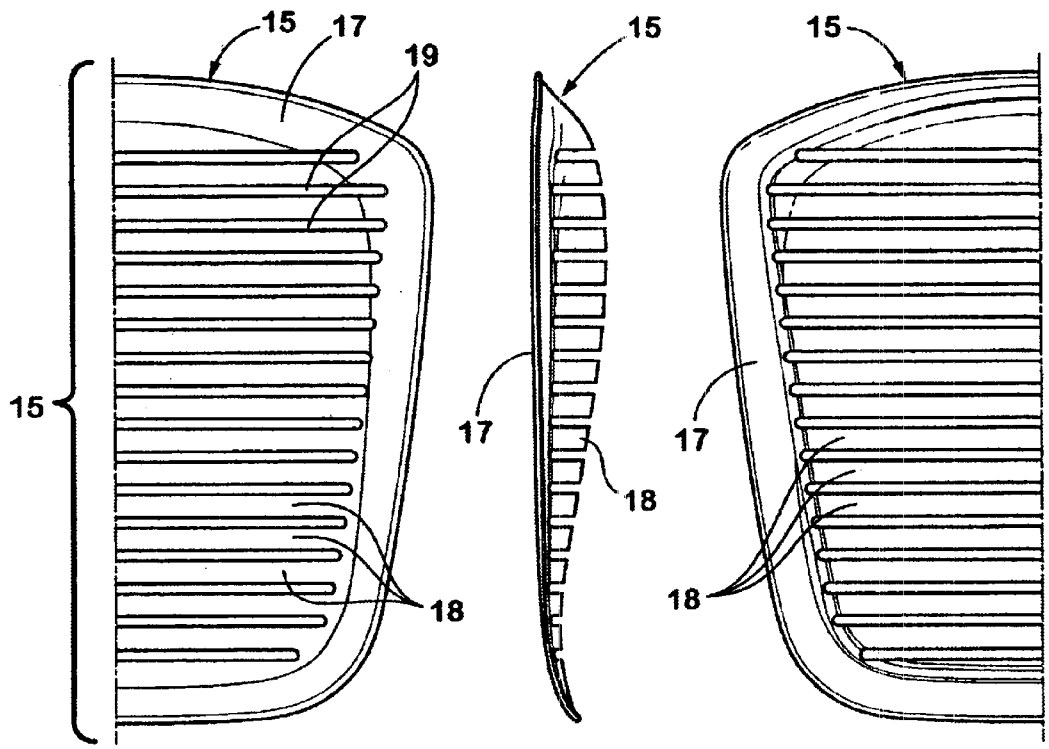
FIGS. 2–4 are top, side, and bottom views of a panel component portion of the seat shown in FIG. 1.

Chair 20 (FIG. 1) incorporates furniture components embodying the present invention, such as the illustrated back 11, seat 12 and armrests 13. The present disclosure focuses on the seat 12, but it is contemplated that the same inventive principles can be applied to the back 11 or to other furniture structures by a person of ordinary skill in this art, such that a detailed description of the back 11 and other furniture structures is not required herein for a person of ordinary skill to understand the present invention. Further, it is contemplated that the concepts of the present invention broadly apply to any article having a panel component and a perimeter frame for stabilizing and supporting the panel component, as described below.

Chair 20 is adequately described below for an understanding of the present invention. Nonetheless, it is noted that the chair 20 is described in detail in patent application Ser. No. 09/578,568, filed May 25, 2000, entitled SYNCHROTILT CHAIR, the entire contents of which are incorporated herein in their entirety. Chair 20 includes a base 21, and an H-shaped link 22. The base 21, the back 11 (including rigidly attached arms 14 and 14A), the seat 12, and the link 22 are pivoted to each other to make up a four bar linkage arrangement that causes the seat 12 and the back 11 to move with a synchronous motion upon recline of the back 11. A spring, such as a torsion spring (not specifically shown), is mounted at one (or more) of the pivots and biases the back 11 and seat 12 to upright positions.

Figures 5, 6, 7:
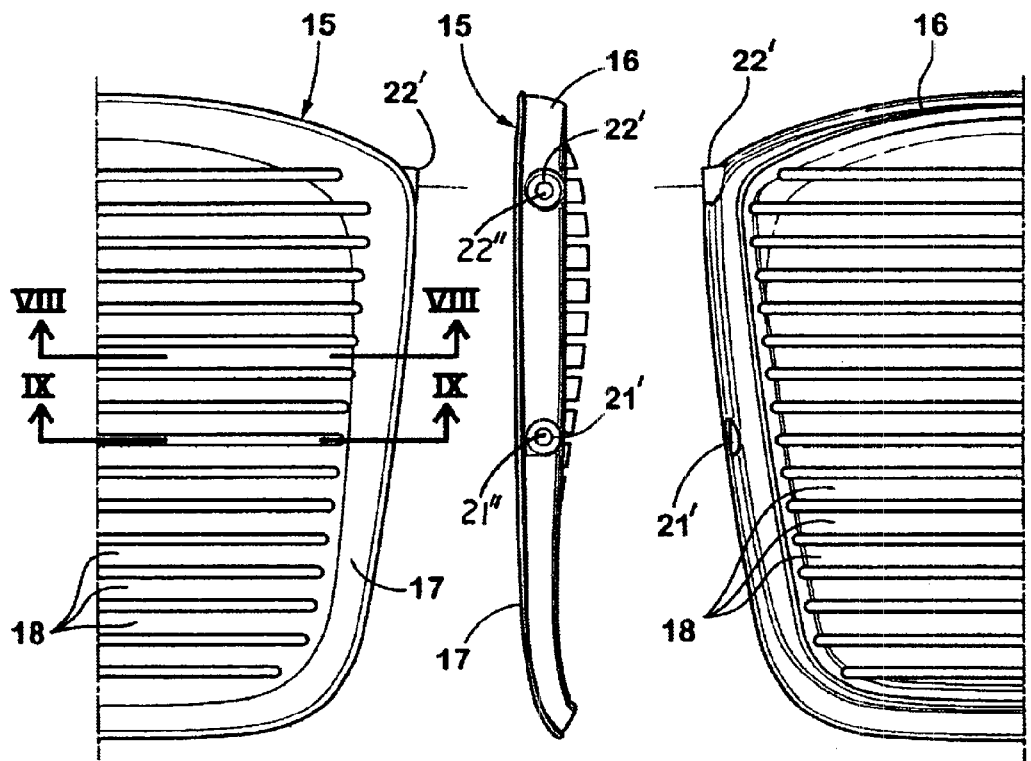
FIGS. 5–7 are top, side, and bottom views of the seat shown in FIG. 1, including the tubular perimeter frame integrally molded onto a bottom of the panel component of FIG. 2.

The seat 12 includes a panel component 15 (FIGS. 2–3) made of a flexible compliant plastic, and further includes a rigid tubular perimeter frame 16 (FIGS. 4–6) made of stiff glass-fiber-reinforced plastic integrally molded onto and hence bonded to a perimeter flange 17 of the panel component 15 to structurally support the panel component 15. More specifically, the panel component 15 includes an enlarged central area of horizontally extending flexible strips 18. The strips 18 are separated by parallel slots 19 that extend between side sections of the perimeter flange 17. The perimeter flange 17 and the strips 18 have a concave shape and smooth visible top surface optimally suited to comfortably receive and support a seated user's bottom. The strips 18 are dissimilar in length (see the seat 12 in FIG. 1) and potentially divided by discontinuous slots (see the back 11 in FIG. 1), such that, in combination with the flexibility of the compliant plastic material from which they are made, they twist and flex in a manner that provides optimal comfortable support for a seated user. The perimeter flange 17 is about 20 to 40 mm wide, and has a top visible surface that extends generally horizontally but that is angled inwardly to lead smoothly onto a top surface of the strips 18. A downwardly extending lip 19A is formed around an edge of the perimeter flange 17 (see FIG. 8).

The illustrated panel component 15 is about 4 to 5 mm thick, and the strips 18 are about 15 to 25 mm wide, with the slots separating the strips 18 being about 3 to 5 mm or less wide. The slots 18 are rounded on their ends to reduce a tendency of the strips 18 to tear or break over time while in use. The compliant material of the panel component 15 is preferably a polypropylene material that is characteristically not glass reinforced. However, it is noted that other materials can be used, depending upon the functional requirements of a particular application. The compliant material is preferably a material that facilitates molding a long-lasting defect-free show surface for optimal aesthetics, and in the present case is preferably colorable or paintable.

The perimeter frame 16 extends continuously around the enlarged show area and is made by gas assist processes, which cause the perimeter frame to be tubular and hollow for increased strength-to-weight ratio. The illustrated perimeter frame 16 forms a tubular loop completely around the panel component 15 and has wall thicknesses of about 4 to 10 mm. The perimeter frame 16 has a quadrilateral shape optimally suited to withstand and distribute stress, and to stabilize the panel component 15. The shape and wall thicknesses of the perimeter frame 16 may vary along different sections of the perimeter frame 16. The perimeter frame 16 has a top surface that bonds to the underside of the perimeter flange 17 of the panel component 15 during molding of the perimeter frame 16 onto the perimeter flange 17. The perimeter frame 17 is preferably a reinforced material. For example, a 30% glass fiber reinforced polypropylene will work well for this purpose. The materials of the panel component 15 and the perimeter frame 16 are compatible such that they bond strongly together during the gas-assisted injection molding of the perimeter frame 16 onto the panel component 15. The perimeter frame 16 can be reinforced by a material other than glass fibers, and it is to be understood that the amount of stiffening is greatly affected by the dimensional and functional requirements of particular designs. In the present seat 12, an important feature is that the front and side profiles of the seat 12 be maintained at relatively thin dimensions to help give the chair 10 a sleek and clean look. Where thin dimensions are not required, thicker sections can be used along with reduced percentages of reinforcement material. Where weight is less of a constraint, a solid perimeter frame can be used, such as is illustrated at 16A and mount 21A in FIGS. 10 and 11. However, where weight and/or strength-to-weight ratios are important, such as in the present chair 10, tubular perimeter frames will be used, such as are illustrated in FIGS. 8–9.

Front and rear mounts 21' and 22' (FIGS. 6–7) are formed in the perimeter frame 16 during molding of the perimeter frame 16. The tubular section of perimeter frame 16 is formed by top, inner, bottom, and outer walls 23–26 (FIG. 8). At mounts 21' and 22', a recess 27 is formed in the outer wall and is defined by cylindrical wall section 28 (FIG. 9). If added strength is needed in the mounts, the cylindrical wall section 28 can be reinforced by a cup-shaped metal insert or bearing 21" (and 22") positioned in and attached to the mount, either during molding (e.g. by insert molding techniques) or after molding (e.g. by secondary post-molding processes).

Figure 12:
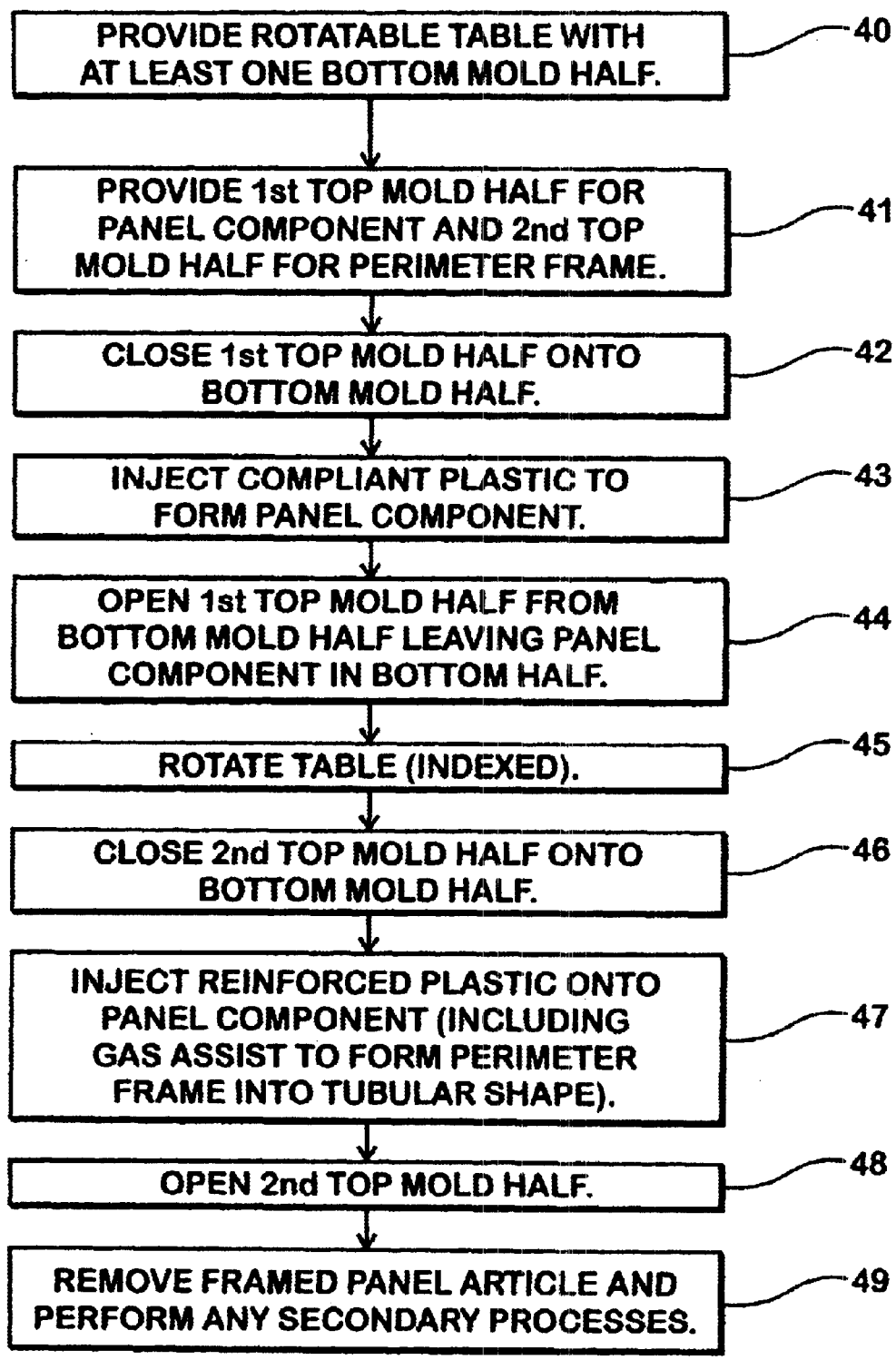
FIG. 12 is a flow diagram showing a method of molding for manufacturing the seating furniture article shown in FIG. 5.

The method (FIG. 12) includes providing a rotatable table with at least one bottom mold half (step 40). Preferably, the table includes one bottom mold half for each molding station (there are at least two molding stations) and for an unloading station and a cleaning station, so that the process can be made semi-continuous. A first top mold half is provided for the station for molding the panel component and a second top mold half is provided for the station for molding the perimeter frame (step 41). The first top mold half is closed onto the bottom mold half (step 42), and compliant plastic material is injected into the mold cavity to form the compliant panel component (step 43). Upon cooling of the material, the first top mold is lifted, leaving the panel component in the bottom mold half (step 44) and the table is rotated to position the bottom mold half and part at the next station (step 45). The second top mold is then closed (step 46) and reinforced plastic material is injected into the mold cavity and cooled (step 47). If desired, the reinforced plastic material is injected using a gas-assisted injection molding process that results in the perimeter frame 16 being tubular. The second top mold half is then lifted (step 48), and the completed framed panel article is removed from the bottom mold half (step 49). Secondary processes are completed as needed (e.g. painting, finishing, insertion of post-attached bearings in the mounts) and the part is readied for assembly into a final product, such as the chair 10.

It is contemplated that a breadth of the present invention extends well beyond a chair component, as will be understood by a person of ordinary skill in this art based on the above teachings. For example, it is contemplated that the present invention includes any furniture component or article of use having a panel component and perimeter frame as defined in the claims below, and further includes any method as defined in the claims below. Specifically, it is contemplated that the present inventive concepts may include a display stand with a display panel and integral perimeter frame, an upright marker board, an easel, a table, a worksurface, a cabinet, and many other structures incorporating a panel component having a first preferred material, and having a perimeter frame made of a stiff second preferred material for supporting the same. Further, the present disclosure teaches a method for making the same.

In the foregoing description, those skilled in the art will readily appreciate that modifications may be made to the invention without departing from the concepts disclosed herein. Such modifications are to be considered as included in the following claims, unless these claims by their language expressly state otherwise.

What is claimed is:

1. A furniture component comprising:

a base;

a panel component made of a flexible compliant plastic, the panel component having a continuous perimeter flange and further having integral flexible strips molded of the same compliant plastic with slots therebetween extending between portions of the perimeter flange that are shaped to flex to comfortably support a human body part, the strips having an elongated cross section with a long width dimension and a short perpendicular dimension; and a perimeter frame pivoted to the base and made of a reinforced structural plastic different than the flexible compliant plastic, the perimeter frame being integrally molded onto and bonded to the perimeter flange to stiffen the perimeter flange and support the panel component.

2. The furniture component defined in claim 1, wherein the frame includes at least one tubular section and further includes attachment mounts integrally formed thereon adapting the furniture component for attachment to a base component.

3. The furniture component defined in claim 1, wherein the reinforced structural plastic includes a glass fiber filler.

4. The furniture component defined in claim 1, wherein the strips are unequal in length.

5. The furniture component defined in claim 1, wherein the perimeter frame includes at least one pair of opposing mounts integrally formed therein for providing secure attachment to the perimeter frame.

6. The furniture component defined in claim 5, wherein the mounts include insert-molded metal components.

7. The furniture component defined in claim 5, wherein the mounts include a front pair and a rear pair of mounts.

8. The furniture component defined in claim 1, wherein the panel component forms a seat for a chair.

9. The furniture component defined in claim 1, wherein the panel component forms a back for a chair.

10. The furniture component defined in claim 1, wherein the panel component forms an armrest for a chair.

11. The furniture component defined in claim 1, wherein the perimeter flange extends outwardly and extends generally parallel the panel component.

12. The furniture component defined in claim 1, wherein the perimeter frame is hidden from view by the perimeter flange when viewed from above.

13. A furniture component comprising:

a panel component made of a flexible compliant plastic, the panel component having a continuous perimeter flange and further having flexible strips extending between portions of the perimeter flange that are shaped to flex to comfortably support a human body part; and a perimeter frame made of a reinforced structural plastic different than the flexible compliant plastic, the perimeter frame being integrally molded onto and bonded to the perimeter flange to stiffen the perimeter flange and support the panel component, wherein the perimeter frame includes attachment mounts integrally formed thereon adapting the furniture component for attachment to a base component and comprises a hollow tubular component.

14. The furniture component defined in claim 13, wherein the perimeter frame is tubular and is made utilizing a gas assist molding process.

15. The furniture component defined in claim 14, wherein the perimeter frame is hoop shaped and extends completely around the perimeter flange.

16. A furniture component comprising:

a base;

a panel component made of a flexible compliant plastic, the panel component having a continuous perimeter flange and further having flexible strips with slots therebetween extending between portions of the perimeter flange that are shaped to flex to comfortably support a human body part, the strips having an elongated cross section with a long width dimension and a short perpendicular dimension; and a perimeter frame pivoted to the base and made of a reinforced structural plastic different than the flexible compliant plastic, the perimeter frame being integrally molded onto and bonded to the perimeter flange to stiffen the perimeter flange and support the panel component;

wherein the reinforced structural plastic includes a glass fiber filler;

wherein the compliant plastic includes a base plastic as the reinforced plastic, but does not include any glass fiber filler.

17. The furniture component defined in claim 1, wherein the panel component includes a central area having the strips therein, the strips extending in parallel directions.

18. The furniture component defined in claim 17, wherein the panel component defines one of a seat and a back for a chair having a front, and wherein the strips extend from side to side.

19. An article comprising:

a panel component of a first material having a flexible central area with an enlarged surface defined by flexible leaf-spring-shaped strips and having a perimeter flange extending continuously around the central area; and a frame of a polymeric second material integrally molded onto and bonded to the perimeter flange to stiffen and support the panel component, the second material being characteristically stiff to provide rigid lightweight structural support around a perimeter of the panel component and including sections defining molded-in pivot mounts with cup-shaped bearing inserts therein.

20. An article comprising:

a panel component of a first material having a central area with an enlarged surface and having a perimeter flange extending continuously around the central area; and tubular frame of a polymeric second material integrally molded onto and bonded to the perimeter flange to stiffen and support the panel component, the second material being characteristically stiff to provide rigid lightweight structural support around a perimeter of the panel component, wherein the tubular frame has an internal cavity that extends around the perimeter under the perimeter flange and that is characteristically made by a process including gas assist molding.

21. The article defined in claim 19, wherein the panel component includes flexible strips separated by slots.

22. The article defined in claim 19, wherein the tubular frame includes integrally formed attachment mounts for secure attachment to the tubular frame.

* * * * *